(12) United States Patent
Chendamarai Kannan et al.

(10) Patent No.: US 10,645,679 B2
(45) Date of Patent: May 5, 2020

(54) HYBRID AUTOMATIC REPEAT REQUEST (HARQ) PAYLOAD MAPPING FOR SHORT PHYSICAL UPLINK CONTROL CHANNEL (PUCCH) ON A SHARED COMMUNICATION MEDIUM

(71) Applicant: QUALCOMM Incorporated, San Diego, CA (US)

(72) Inventors: Arumugam Chendamarai Kannan, San Diego, CA (US); Tao Luo, San Diego, CA (US); Chirag Sureshbhai Patel, San Diego, CA (US); Tamer Adel Kadous, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 144 days.

(21) Appl. No.: 15/353,938

(22) Filed: Nov. 17, 2016

(65) Prior Publication Data
US 2017/0142705 A1 May 18, 2017

Related U.S. Application Data

(60) Provisional application No. 62/257,174, filed on Nov. 18, 2015.

(51) Int. Cl.
*H04W 72/04* (2009.01)
*H04L 1/18* (2006.01)
*H04L 1/16* (2006.01)

(52) U.S. Cl.
CPC ....... *H04W 72/0413* (2013.01); *H04L 1/1812* (2013.01); *H04L 1/1822* (2013.01);
(Continued)

(58) Field of Classification Search
CPC ... H04L 1/1812; H04L 1/1854; H04L 1/1822; H04W 72/0413; H04W 72/042; H04W 72/0446
See application file for complete search history.

(56) References Cited

U.S. PATENT DOCUMENTS

2011/0107168 A1* 5/2011 Jung .................... H04L 1/1614
714/748
2014/0036889 A1 2/2014 Kim et al.
(Continued)

OTHER PUBLICATIONS

International Search Report and Written Opinion—PCT/US2016/062738—ISA/EPO—dated Feb. 13, 2017.

*Primary Examiner* — Yemane Mesfin
*Assistant Examiner* — Henry Baron
(74) *Attorney, Agent, or Firm* — Muncy, Geissler, Olds & Lowe, P.C.

(57) ABSTRACT

Techniques for transmitting acknowledgments on a shared communication medium are disclosed. In an aspect, an access terminal receives, from an access point, a plurality of downlink subframes on a downlink channel of the wireless communication medium, the plurality of downlink subframes carrying data for a plurality of processes. The access terminal transmits, to the access point, acknowledgments for the plurality of downlink subframes on an uplink subframe of an uplink channel of the wireless communication medium on one or more occasions, the uplink subframe including a plurality of bits, the plurality of bits corresponding to the plurality of downlink subframes or the plurality of processes.

38 Claims, 10 Drawing Sheets

(52) U.S. Cl.
CPC ......... *H04L 1/1854* (2013.01); *H04W 72/042* (2013.01); *H04W 72/0446* (2013.01); *H04L 1/1614* (2013.01); *H04L 1/1685* (2013.01)

(56) References Cited

U.S. PATENT DOCUMENTS

| | | | |
|---|---|---|---|
| 2014/0086175 A1* | 3/2014 | Hakola | H04W 72/1242 370/329 |
| 2015/0092715 A1 | 4/2015 | Seo et al. | |
| 2015/0173102 A1* | 6/2015 | Ruiz Delgado | H04L 1/1864 370/280 |
| 2015/0271839 A1* | 9/2015 | She | H04L 1/1829 370/329 |

\* cited by examiner

HYBRID AUTOMATIC REPEAT REQUEST (HARQ) PAYLOAD MAPPING FOR SHORT PHYSICAL UPLINK CONTROL CHANNEL (PUCCH) ON A SHARED COMMUNICATION MEDIUM

CROSS-REFERENCE TO RELATED APPLICATIONS

The present application for patent claims the benefit of U.S. Provisional Application No. 62/257,174, entitled "HARQ PAYLOAD MAPPING FOR SHORT PUCCH ON A SHARED COMMUNICATION MEDIUM," filed Nov. 18, 2015, assigned to the assignee hereof, and expressly incorporated herein by reference in its entirety.

INTRODUCTION

Aspects of this disclosure relate generally to telecommunications, and more particularly to operations on a shared communication medium and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Small cell LTE operations, for example, have been extended into the unlicensed frequency spectrum such as the Unlicensed National Information Infrastructure (U-NII) band used by Wireless Local Area Network (WLAN) technologies. This extension of small cell LTE operation is designed to increase spectral efficiency and hence capacity of the LTE system. However, it may also encroach on the operations of other Radio Access Technologies (RATs) that typically utilize the same unlicensed bands, most notably IEEE 802.11x WLAN technologies generally referred to as "Wi-Fi."

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method for transmitting acknowledgments on a wireless communication medium includes receiving, at an access terminal from an access point, a plurality of downlink subframes on a downlink channel of the wireless communication medium, the plurality of downlink subframes carrying data for a plurality of processes, and transmitting, by the access terminal to the access point, acknowledgments for the plurality of downlink subframes on an uplink subframe of an uplink channel of the wireless communication medium on one or more occasions, the uplink subframe including a plurality of bits, the plurality of bits corresponding to the plurality of downlink subframes or the plurality of processes.

In an aspect, an apparatus for transmitting acknowledgments on a wireless communication medium includes a receiver of an access terminal configured to receive, from an access point, a plurality of downlink subframes on a downlink channel of the wireless communication medium, the plurality of downlink subframes carrying data for a plurality of processes, and a transmitter of the access terminal configured to transmit, to the access point, acknowledgments for the plurality of downlink subframes on an uplink subframe of an uplink channel of the wireless communication medium on one or more occasions, the uplink subframe including a plurality of bits, the plurality of bits corresponding to the plurality of downlink subframes or the plurality of processes.

In an aspect, an access terminal configured to transmit acknowledgments on a wireless communication medium includes a means for receiving configured to receive, from an access point, a plurality of downlink subframes on a downlink channel of the wireless communication medium, the plurality of downlink subframes carrying data for a plurality of processes, and a means for transmitting configured to transmit, to the access point, acknowledgments for the plurality of downlink subframes on an uplink subframe of an uplink channel of the wireless communication medium on one or more occasions, the uplink subframe including a plurality of bits, the plurality of bits corresponding to the plurality of downlink subframes or the plurality of processes.

In an aspect, a non-transitory computer-readable medium storing computer-executable code for transmitting acknowledgments on a wireless communication medium includes computer-executable code comprising at least one instruction to cause an access terminal to receive, from an access point, a plurality of downlink subframes on a downlink channel of the wireless communication medium, the plurality of downlink subframes carrying data for a plurality of processes, and at least one instruction to cause the access terminal to transmit, to the access point, acknowledgments for the plurality of downlink subframes on an uplink subframe of an uplink channel of the wireless communication medium on one or more occasions, the uplink subframe including a plurality of bits, the plurality of bits corresponding to the plurality of downlink subframes or the plurality of processes.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

The present disclosure relates generally to transmitting acknowledgments on a shared communication medium. In an aspect, an access terminal receives, from an access point, a plurality of downlink subframes on a downlink channel of the wireless communication medium, the plurality of downlink subframes carrying data for a plurality of processes. The access terminal transmits, to the access point, acknowledgments for the plurality of downlink subframes on an uplink subframe of an uplink channel of the wireless communication medium on one or more occasions, the uplink subframe including a plurality of bits, the plurality of bits corresponding to the plurality of downlink subframes or the plurality of processes.

These and other aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
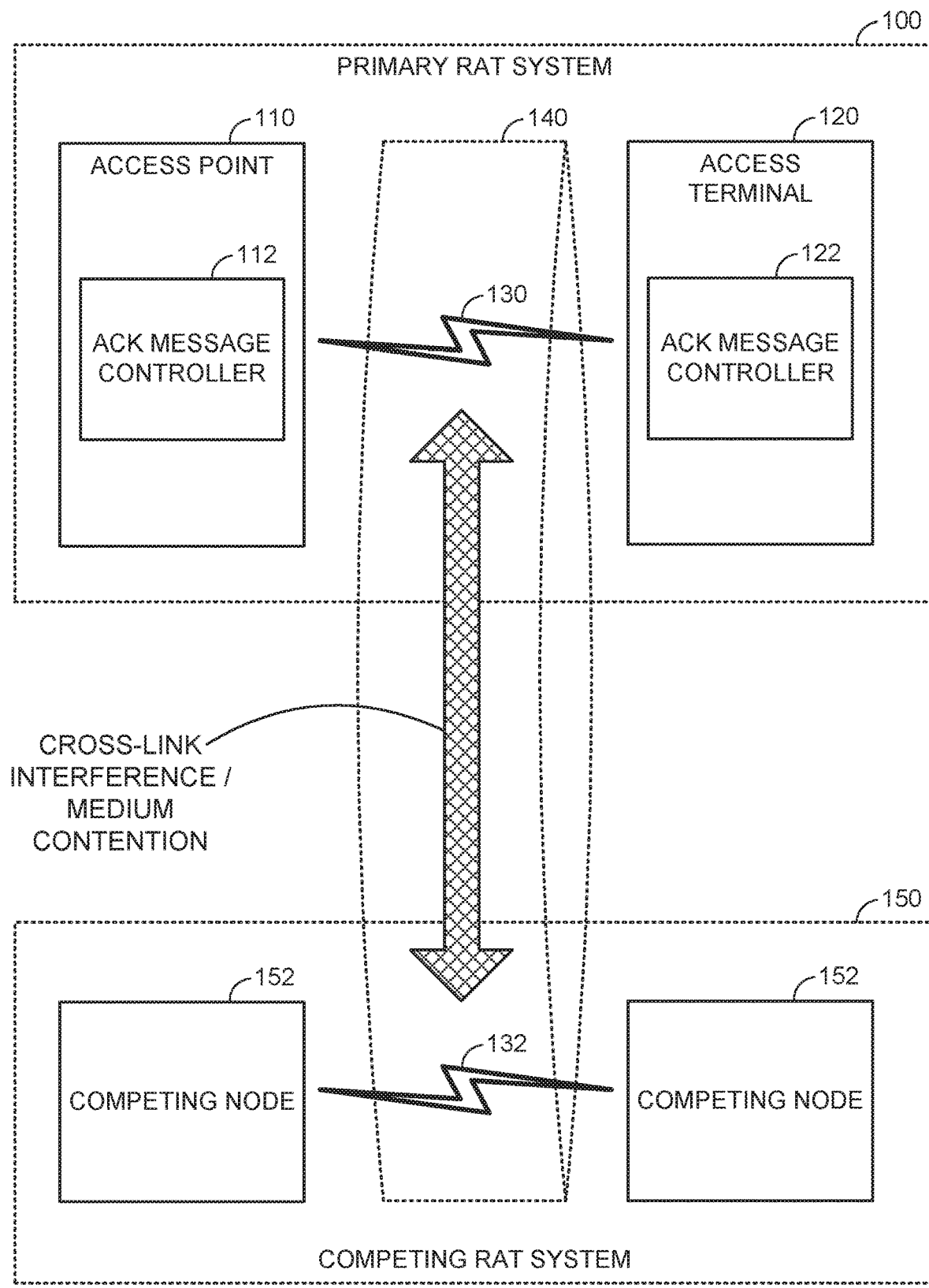
FIG. 1 is a system-level diagram illustrating an example wireless network environment.

FIG. 1 is a system-level diagram illustrating an example wireless network environment, shown by way of example as including a "primary" Radio Access Technology (RAT) system 100 and a "competing" RAT system 150. Each system may be composed of different wireless nodes generally capable of receiving and/or transmitting over a wireless link, including information related to various types of communication (e.g., voice, data, multimedia services, associated control signaling, etc.). The primary RAT system 100 is shown as including an access point 110 and an access terminal 120 in communication with each other over a wireless link 130. The competing RAT system 150 is shown as including two competing nodes 152 in communication with each other over a separate wireless link 132, and may similarly include one or more access points, access terminals, or other types of wireless nodes. As an example, the access point 110 and the access terminal 120 of the primary RAT system 100 may communicate via the wireless link 130 in accordance with Long Term Evolution (LTE) technology, while the competing nodes 152 of the competing RAT system 150 may communicate via the wireless link 132 in accordance with Wi-Fi technology. It will be appreciated that each system may support any number of wireless nodes distributed throughout a geographic region, with the illustrated entities being shown for illustration purposes only.

Unless otherwise noted, the terms "access terminal" and "access point" are not intended to be specific or limited to any particular RAT. In general, access terminals may be any wireless communication device allowing a user to communicate over a communications network (e.g., a mobile phone, router, personal computer, server, entertainment device, Internet of Things (IOT)/Internet of Everything (IOE) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with access terminals depending on the network in which the access point is deployed, and may be alternatively referred to as a Base Station (BS), a Network Node, a NodeB, an evolved NodeB (eNB), etc. Such an access point may correspond to a small cell access point, for example. "Small cells" generally refer to a class of low-powered access points that may include or be otherwise referred to as femto cells, pico cells, micro cells, Wireless Local Area Network (WLAN) access points, other small coverage area access points, etc. Small cells may be deployed to supplement macro cell coverage, which may cover a few blocks within a neighborhood or several square miles in a rural environment, thereby leading to improved signaling, incremental capacity growth, richer user experience, and so on.

Returning to FIG. 1, the wireless link 130 used by the primary RAT system 100 and the wireless link 132 used by the competing RAT system 150 may operate over a shared communication medium 140. A communication medium of this type may be composed of one or more frequency, time, and/or space communication resources (e.g., encompassing one or more channels across one or more carriers). As an example, the communication medium 140 may correspond to at least a portion of an unlicensed frequency band. Although different licensed frequency bands have been reserved for certain communications (e.g., by a government entity such as the Federal Communications Commission (FCC) in the United States), some systems, in particular those employing small cell access points, have extended operation into unlicensed frequency bands such as the Unlicensed National Information Infrastructure (U-NII) band used by WLAN technologies including Wi-Fi.

Due to the shared use of the communication medium 140, there is the potential for cross-link interference between the wireless link 130 and the wireless link 132. Further, some RATs and some jurisdictions may require contention or "Listen Before Talk (LBT)" for access to the communication medium 140. As an example, a Clear Channel Assessment (CCA) protocol may be used in which each device verifies via medium sensing the absence of other traffic on a shared communication medium before seizing (and in some cases reserving) the communication medium for its own transmissions. In some designs, the CCA protocol may include distinct CCA Preamble Detection (CCA-PD) and CCA Energy Detection (CCA-ED) mechanisms for yielding the communication medium to intra-RAT and inter-RAT traffic, respectively. The European Telecommunications Standards Institute (ETSI), for example, mandates contention for all devices regardless of their RAT on certain communication mediums such as unlicensed frequency bands.

As will be described in more detail below, the access point 110 and/or the access terminal 120 may be variously configured in accordance with the teachings herein to provide or otherwise support the techniques discussed briefly above. For example, the access point 110 may include an acknowledgment message controller 112, while the access terminal 120 may include an acknowledgment message controller 122. The acknowledgment message controller 112 and the acknowledgment message controller 122 may be, for example, software modules executed by a processor of the access point 110 and the access terminal 120, respectively, or hardware or firmware modules configured to perform the functionality described herein. For example, the acknowledgment message controller 122 (optionally in conjunction with a processor and/or receiver/transceiver of the access terminal 120) may receive, from the access point 110, a plurality of downlink subframes on a downlink channel of the wireless communication medium, the plurality of downlink subframes carrying data for a plurality of processes. The acknowledgment message controller 122 (optionally in conjunction with a processor and/or transmitter/transceiver of the access terminal 120) may transmit, to the access point 110, acknowledgments for the plurality of downlink subframes on an uplink subframe of an uplink channel of the wireless communication medium on one or more occasions, the uplink subframe including a plurality of bits, the plurality of bits corresponding to the plurality of downlink subframes or the plurality of processes.

Figure 2:
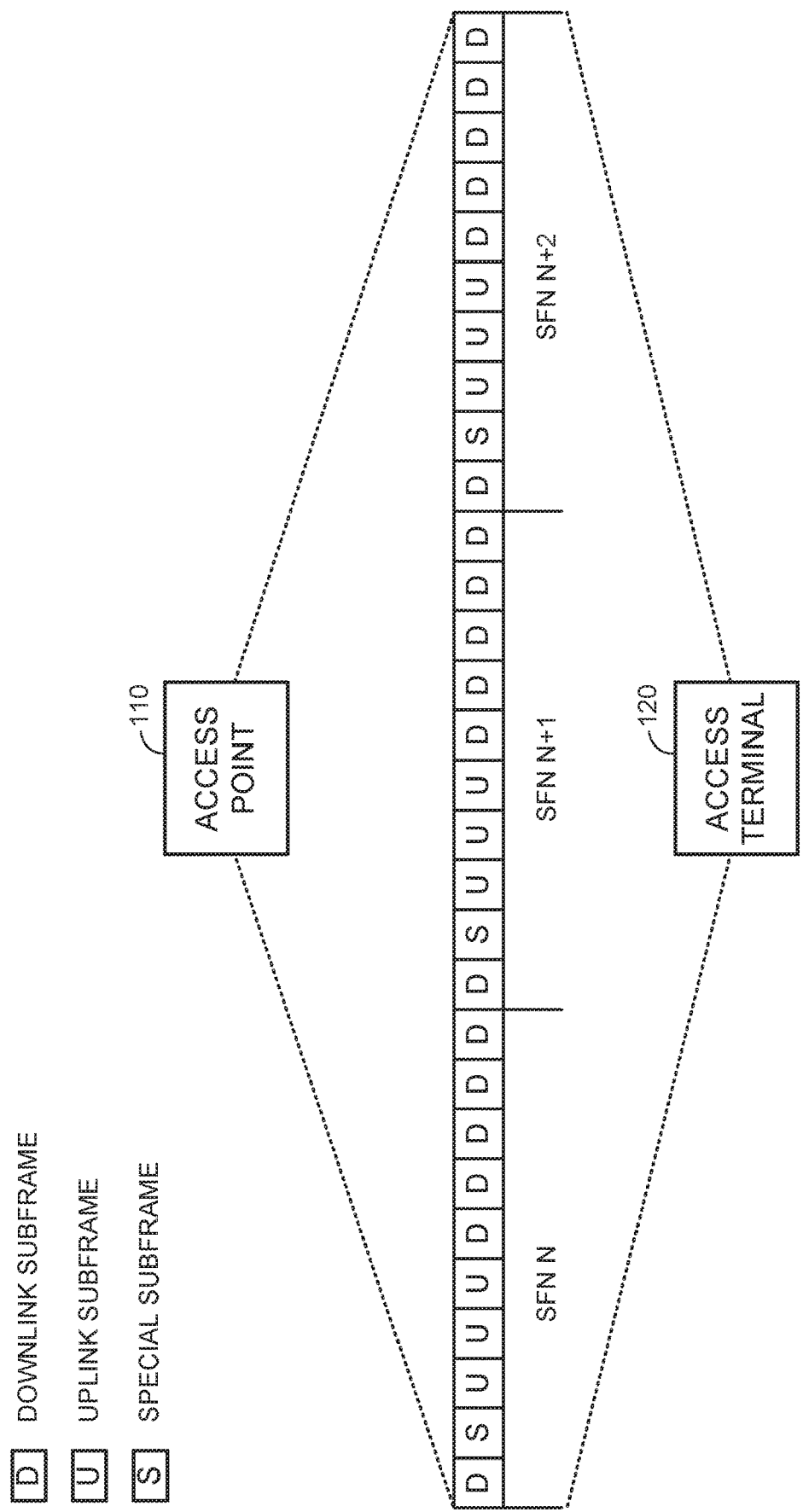
FIG. 2 illustrates an example Time Division Duplexing (TDD) frame structure

FIG. 2 illustrates an example Time Division Duplexing (TDD) frame structure that may be implemented for the primary RAT system 100 to facilitate contention-based access to the communication medium 140.

The illustrated frame structure includes a series of radio frames (RFs) that may be numbered in accordance with a System Frame Number (SFN) numerology (SFN N, N+1, N+2, etc.) and divided into respective subframes (SFs), which may also be numbered for reference (e.g., SF0, SF1, etc.). Each respective subframe may be further divided into slots (not shown in FIG. 2), and the slots may be further divided into symbol periods. As an example, the LTE frame structure includes system frames that are divided into 1024 numbered radio frames composed of 10 subframes each, which together constitute an SFN cycle (e.g., lasting 10.24 s for 10 ms radio frames having 1 ms subframes). Each subframe may comprise two slots, and each slot may comprise six or seven symbol periods. The use of a frame structure may provide more natural and efficient coordination among devices than more ad hoc signaling techniques.

The example frame structure of FIG. 2 is TDD in that each subframe may be variously operated at different times as a downlink (D), uplink (U), or special (S) subframe. In general, downlink subframes are reserved for transmitting downlink information from the access point 110 to the access terminal 120, uplink subframes are reserved for transmitting uplink information from the access terminal 120 to the access point 110, and special subframes may include a downlink portion and an uplink portion separated by a guard period. Different arrangements of downlink, uplink, and special subframes may be referred to as different TDD configurations. Returning to the LTE example above, the TDD variant of the LTE frame structure includes 7 TDD configurations (TDD Config 0 through TDD Config 6), with each configuration having a different arrangement of downlink, uplink, and special subframes. For example, some TDD configurations may have more downlink subframes and some may have more uplink subframes to accommodate different traffic scenarios. In the illustrated example of FIG. 2, a TDD configuration is employed that is similar to TDD Config 3 in LTE.

In some designs, the frame structure of FIG. 2 may be "fixed" in that the location of each subframe may be predetermined in relation to an absolute time, but may or may not be occupied by primary RAT signaling in any given instance due to the contention procedure for accessing the communication medium 140. For example, if the access point 110 or the access terminal 120 fails to win contention for a given subframe that subframe may be silenced. In other designs, however, the frame structure of FIG. 2 may be "floating" in that the location of each subframe may be dynamically determined in relation to the point at which access to the communication medium 140 is secured. For example, the start of a given frame (e.g., SFN N) may be delayed in relation to an absolute time until the access point 110 or the access terminal 120 is able to win contention.

As will be described in more detail below, one or more subframes designated to carry uplink information (e.g., the uplink or special subframes) may be configured to provide a supplemental "short" uplink control channel described by way of example below as a short Physical Uplink Control Channel (referred to interchangeably herein as "short PUCCH" or "sPUCCH"). The sPUCCH may be used to complement other uplink control channels of the primary RAT system 100 by carrying short-duration signaling such as acknowledgment messages, channel quality indicators, and so on. In some instances, the sPUCCH may be transmitted on a subset of the total number of symbols allocated to a subframe, such as on the uplink symbols of a special subframe.

The shorter length of the short PUCCH provides a number of advantages. One advantage is that the shorter length allows for more opportunistic transmission. For example, information may be transmitted during truncated subframes, such as special subframes. Another advantage is the efficient usage of resources for small payloads. Yet another advantage is that the short PUCCH may potentially be subject to less stringent Listen-Before-Talk (LBT) requirements. For example, relatively short control signaling transmissions may not be subject to clear channel assessment (CCA) under the ETSI rules (provided they are shorter than a certain duration).

The location of certain control signaling (e.g., the particular uplink subframes to be used for a given signal) may be scheduled (e.g., by the acknowledgment message controller 112 and/or the acknowledgment message controller 122) for acknowledgement procedures, such as Hybrid Automatic Repeat Request (HARQ), in a manner that better supports operation on the shared communication medium 140. The HARQ timeline represents the relationship between the time at which the access terminal 120 receives a transmission from the access point 110 on the downlink and the time at which it sends the corresponding acknowledgment to the access point 110 on the uplink.

In LTE in licensed frequency bands, the medium is always available to the access terminal 120, and therefore, the access terminal 120's use of the PUCCH is not grant based and does not rely on a Listen-Before-Talk mechanism. Rather, there is a fixed association between the resources used for downlink transmissions and the uplink acknowledgments. For example, in a frequency-division duplex (FDD) system, for a downlink transmission on subframe N, the corresponding acknowledgment on the PUCCH occurs at subframe N+4. In a TDD system, there is a fixed timeline association based on the configuration of the specific TDD system.

Similar to the use of the PUCCH in LTE in licensed frequency bands, use of the short PUCCH in LTE in unlicensed frequency bands is also not grant based, but may, however, use a Listen-Before-Talk mechanism. Use of a Listen-Before-Talk mechanism is not necessary, however, as utilization of the short PUCCH may be CCA exempt. In contrast to LTE in licensed frequency bands, where the access terminal 120 transmits acknowledgments on uplink subframes, when using short PUCCH in LTE in unlicensed frequency bands, the access terminal 120 transmits acknowledgments during the special subframe or the modified special subframe of a transmission opportunity (TxOP) (as illustrated below with reference to FIGS. 3A-C). Therefore, the HARQ timeline and association rules defining the association between downlink transmissions and the corresponding uplink acknowledgments on the short PUCCH would be beneficial.

Figure 3A:
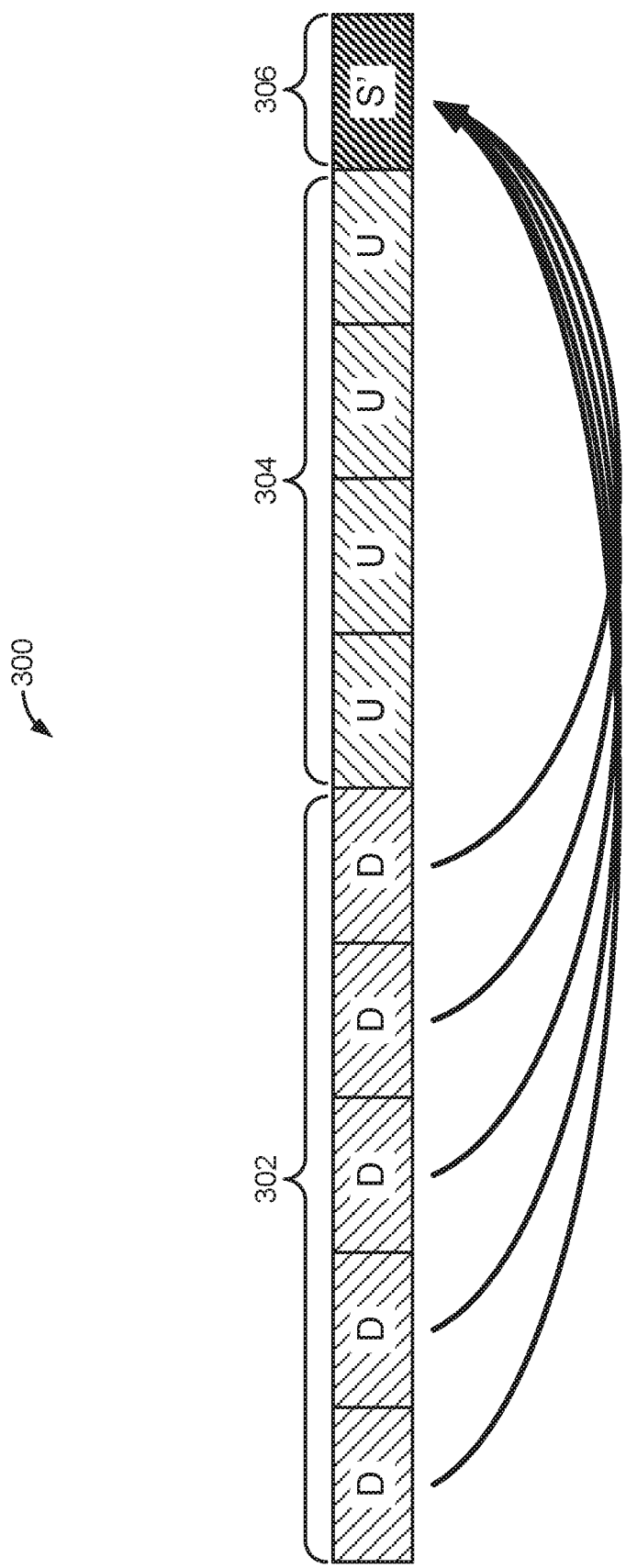
FIG. 3A illustrates an exemplary transmission opportunity (TxOP) where the short Physical Uplink Control Channel (PUCCH) is utilized for acknowledgments according to at least one aspect of the disclosure.

FIG. 3A illustrates an exemplary TxOP 300 where the short PUCCH is utilized for acknowledgments according to at least one aspect of the disclosure. The TxOP 300 comprises a sequence of downlink subframes 302, a sequence of uplink subframes 304, and a modified special subframe 306 on the short PUCCH. In the example of FIG. 3A, the short PUCCH carries only acknowledgment bits for the current TxOP 300. More specifically, the downlink subframes 302 are acknowledged during the modified special subframe 306.

Figure 3B:
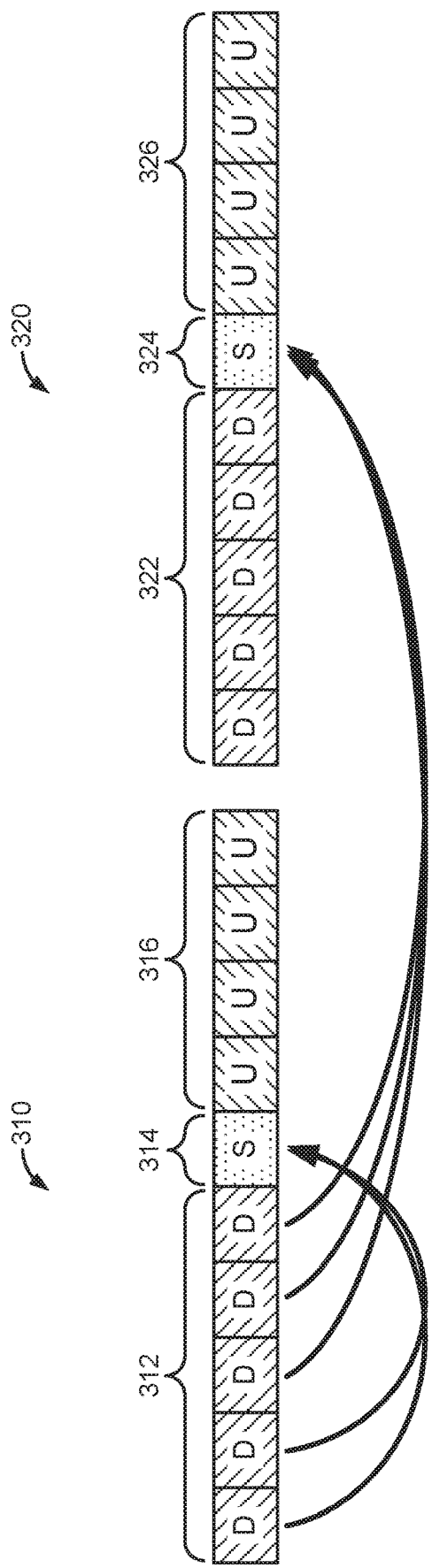
FIG. 3B illustrates exemplary TxOPs where the short PUCCH is utilized for acknowledgments according to at least one aspect of the disclosure.

FIG. 3B illustrates exemplary TxOPs where the short PUCCH is utilized for acknowledgments according to at least one aspect of the disclosure. A first TxOP 310 comprises a sequence of downlink subframes 312, a special subframe 314 on the short PUCCH, and a sequence of uplink subframes 316. A second TxOP 320 comprises a sequence of downlink subframes 322, a special subframe 324 on the short PUCCH, and a sequence of uplink subframes 326. In the example of FIG. 3B, the downlink subframes of downlink subframes 312 that are received at least X (e.g., four where the legacy LTE timing is maintained) subframes before special subframe 314 are acknowledged during special subframe 314, and the remaining downlink subframes 312 are acknowledged during special subframe 324 of the second TxOP 320.

The arrangement of a sequence of downlink subframes, a special subframe, and a sequence of uplink subframes, as in FIG. 3B, is a concept used in LTE in licensed frequency bands. In contrast, the arrangement of a sequence of downlink subframes, a sequence of uplink subframes, and a modified special subframe, as in FIG. 3A, is a concept proposed in the present disclosure.

Figure 3C:
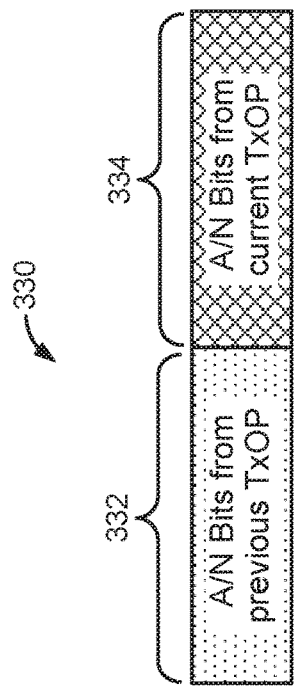
FIG. 3C illustrates an exemplary payload structure of the short PUCCH according to at least one aspect of the disclosure.

FIG. 3C illustrates an exemplary payload structure 330 of the short PUCCH according to at least one aspect of the disclosure. The payload structure 330 may be utilized by the special subframes 314 and 324 in FIG. 3B. A first portion 332 of the payload structure 330 is utilized for acknowledgment bits from the previous TxOP, and a second portion 334 of the payload structure 330 is utilized for acknowledgment bits from the current TxOP.

As illustrated in FIGS. 3A-C, the short PUCCH is transmitted either on the special subframe at the beginning of an uplink burst (e.g., 314/324 of FIG. 3B) or on the modified special subframe at the end of the uplink burst (e.g., 306 of FIG. 3A). As also discussed above with reference to FIGS. 3A-C, the short PUCCH may carry the acknowledgment bits of only the current TxOP (e.g., FIG. 3A) or of both the current and previous TxOP (e.g., FIG. 3B).

The present disclosure presents two approaches for HARQ association. The first approach utilizes subframe-based short PUCCH payload mapping, and the second approach utilizes HARQ-process-based short PUCCH payload mapping.

There are various rules common to both approaches. One rule is that the short PUCCH may carry the acknowledgment for multiple component carriers, multiple-input and multiple-output (MIMO) layers, and HARQ processes. However, because the size of the short PUCCH payload is finite, it may be necessary to limit the amount of information carried in the payload. As such, another rule is to limit the size of the short PUCCH payload when appropriate. There are various mechanisms to limit the size of the payload, which may be semi-statically pre-configured by the access point 110. A first mechanism is HARQ multiplexing, which utilizes an AND operation of acknowledgments across MIMO layers. Specifically, the acknowledgments across MIMO layers are ANDed together, collapsing the acknowledgments into a single bit. Another mechanism is HARQ bundling, which similarly utilizes an AND operation of acknowledgments, but across downlink subframes. Specifically, the acknowledgments across downlink subframes are ANDed together, collapsing the acknowledgments into a single bit. Both HARQ multiplexing and HARQ bundling are currently utilized in LTE in licensed frequency bands.

Yet another mechanism to limit the size of the payload is to limit the number of HARQ processes handled by the short PUCCH. Any remaining HARQ processes may be polled by the access point 110 using the enhanced PUCCH (ePUCCH), a separate uplink channel based on grant. For example, where there are eight HARQ processes, a decision may be made to use short PUCCH for four of them and ePUCCH for the remaining four. Another mechanism is to limit the number of downlink subframes handled by the short PUCCH. As above, any remaining downlink subframes may be polled by the access point 110 using the ePUCCH.

Referring to the first approach mentioned above for utilizing subframe-based short PUCCH payload mapping, when there are multiple component carriers and/or multiple MIMO layers, one of the mechanisms described above to limit the size of the payload can be used (e.g., HARQ multiplexing, HARQ bundling, limiting the number of HARQ processes acknowledged on the short PUCCH, etc.). Within the bits allocated for the current TxOP, the acknowledgment for the $i^{th}$ subframe, not the $i^{th}$ HARQ process, is conveyed in the $i^{th}$ bit of the short PUCCH. This means that the bits within the short PUCCH payload map directly to the subframe indices, not the HARQ processes. Within the bits allocated for the previous TxOP, the acknowledgment for the $i^{th}$ unacknowledged subframe, not the $i^{th}$ HARQ process, of the previous TxOP is conveyed in the $i^{th}$ bit of the short PUCCH. Again, this means that the bits within the short PUCCH payload map directly to the subframe indices, not the HARQ processes. As such, the PUCCH payload is a function of the number of downlink subframes allocated to be handled by the short PUCCH.

For example, in a situation where there are five downlink and five uplink subframes in a TxOP and eight HARQ processes, using the subframe based short PUCCH payload mapping rule, the number of HARQ processes would not matter. Rather, the access terminal 120 would simply acknowledge the five downlink subframes that preceded the short PUCCH payload. In this case, the short PUCCH payload would be a function of the five downlink subframes. For example, the short PUCCH payload may be five bits, or five bits times the number of MIMO layers.

Any subframes not decoded within the timeline of the short PUCCH transmission are set to "N" (for "NACK"). As will be described in more detail with reference to FIG. 4, the access point 110 can either retransmit the subframes later, or asynchronously poll the access terminal 120 using a grant based uplink channel (e.g., ePUCCH).

Further, the current or previous TxOP rule can be extended to the past K TxOPs, which defines the memory of this approach. Specifically, the short PUCCH does not have to contain the acknowledgment bits for only the current and previous TxOP's, but rather, may also contain the previous 2, 3, . . . K TxOPs. However, this requires the access terminal 120 to have a progressively larger memory into the past.

Figure 4:
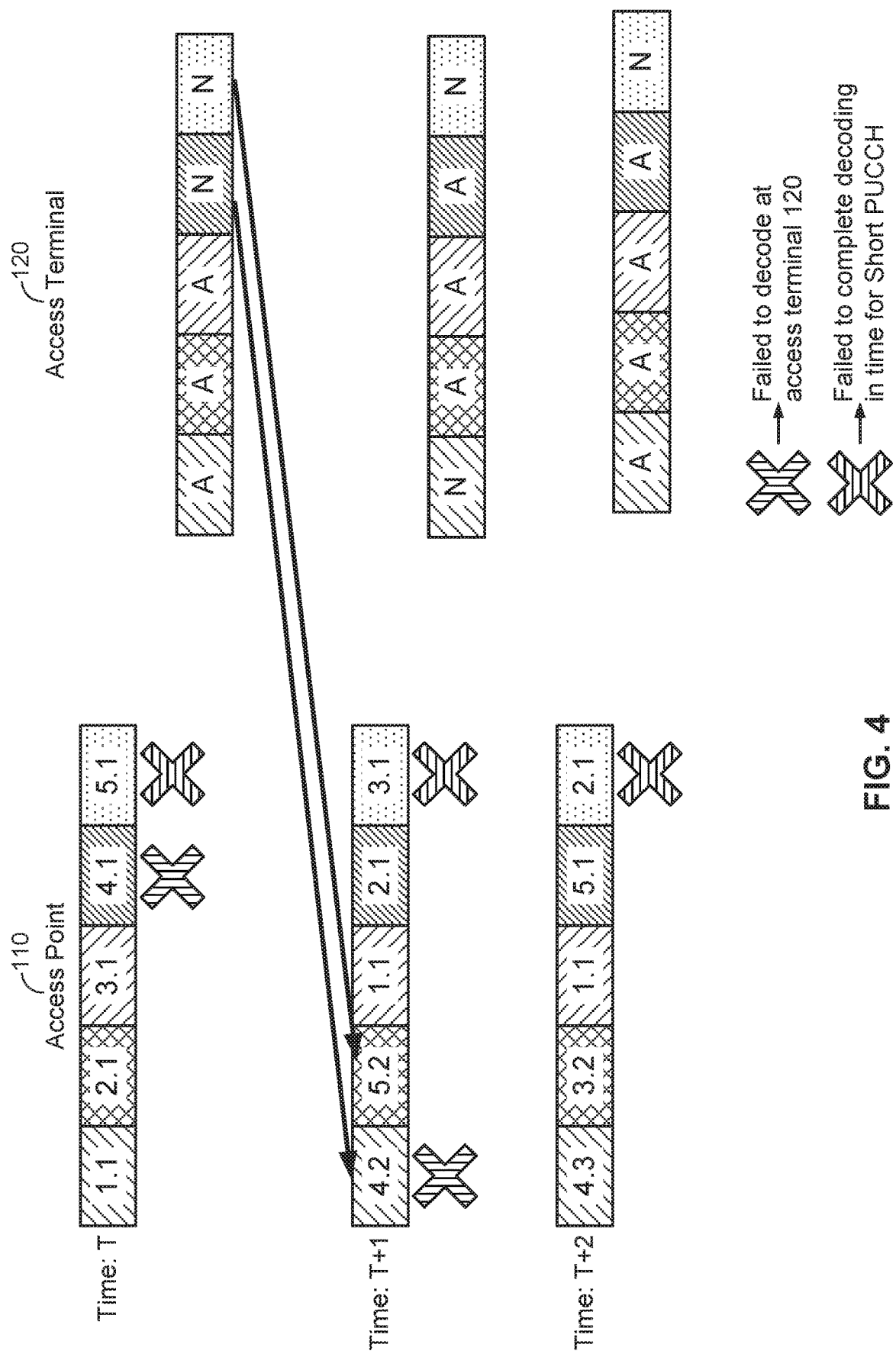
FIG. 4 illustrates an example operation of the subframe based short PUCCH payload mapping approach according to at least one aspect of the disclosure.

FIG. 4 illustrates an example operation of the subframe based short PUCCH payload mapping approach according to at least one aspect of the disclosure. In the example of FIG. 4, on the access point 110 side, FIG. 4 illustrates the downlink subframes from the access point 110 to the access terminal 120 for TxOPs at times T, T+1, and T+2. On the access terminal 120 side, FIG. 4 illustrates the contents of the short PUCCH payloads corresponding to the TxOPs at times T, T+1, and T+2. Note that the times of the TxOPs of T, T+1, and T+2 do not refer to the absolute or relative time between TxOPs, but rather, represent that these are sequential TxOPs between the access point 110 and the access terminal 120.

As further illustrated in FIG. 4, there are five HARQ processes. The value "X.Y" represents the $Y^{th}$ transmission of the same data for the $X^{th}$ HARQ process. Where a transmission (e.g., "X.1") is successfully received and acknowledged, the subsequent transmission is represented as "X.1" because it represents the first transmission of new data.

As illustrated in FIG. 4, at time T, the access point 110 sends five downlink subframes, corresponding to five HARQ processes, to the access terminal 120. However, the access terminal 120 fails to decode the first transmission of the fourth HARQ process (represented as subframe "4.1"), and fails to decode the first transmission of the fifth HARQ process (represented as subframe "5.1") within the timeline of the short PUCCH. As such, the access terminal 120 sets the acknowledgment bits of the short PUCCH payload corresponding to the fourth and fifth subframes to "N" (for "NACK"). Note that the access terminal 120 may not differentiate between a failure to decode and a failure to decode within the timeline of the short PUCCH, and as such, sets the bits corresponding to both of these subframes to N.

At time T+1, the access point 110 transmits new data for HARQ processes 1, 2, and 3 (represented as subframes "1.1," "2.1," and "3.1," respectively), and retransmits the previous transmissions for the fourth and fifth HARQ processes (represented as subframes "4.2" and "5.2," respectively). In the example of FIG. 4, the access terminal 120 again fails to decode the transmission of the fourth HARQ process. The access terminal 120 also fails to decode the transmission for the third HARQ process (in the fifth subframe) within the timeline of the short PUCCH. As such, the access terminal 120 sets the acknowledgment bits of the short PUCCH payload corresponding to the first and fifth subframes to "N." Note that the access terminal 120 sets the bits corresponding to the subframes and not the HARQ processes.

At time T+2, the access point 110 transmits new data for HARQ processes 1, 2, and 5 (represented as subframes "1.1," "2.1," and "5.1," respectively), and retransmits the transmissions for the third and fourth HARQ processes (represented as subframes "3.2" and "4.3," respectively). In the example of FIG. 4, the access terminal 120 again fails to decode the fifth subframe (i.e., the transmission of the second HARQ process, represented as subframe "2.1") within the timeline of the short PUCCH. As such, the access terminal 120 sets the acknowledgment bit in the short PUCCH payload corresponding to the fifth subframe to "N."

In the example of FIG. 4, the access terminal 120 is not able to decode the fifth subframe of each TxOP within the timeline of the short PUCCH. As such, for every current TxOP, the access point 110 retransmits the fifth subframe from the previous TxOP. Instead of doing this, the access point 110 could asynchronously poll the access terminal 120 using a grant-based uplink channel, such as ePUCCH, to determine whether the access terminal 120 received the fifth subframe of the previous TxOP, rather than automatically retransmitting the fifth subframe every time.

Referring now to the HARQ-process-based short PUCCH payload mapping approach, in this approach, the acknowledgment for the $i^{th}$ HARQ process is conveyed in the $i^{th}$ bit of the short PUCCH payload. As such, the PUCCH payload is a function of the number of HARQ processes allocated for the short PUCCH. For example, given 16 HARQ processes, the short PUCCH payload would be budgeted for 16 HARQ processes.

A key difference from the previous approach is that the concept of current and previous TxOPs is not used. Instead, HARQ processes are used to retain memory.

There are two approaches within the HARQ-process-based short PUCCH payload mapping approach. In the first approach, the short PUCCH payload is function of a dynamic number of HARQ processes scheduled at a given time, and in the second approach, the short PUCCH payload is a function of the number of HARQ processes configured semi-statically, and always carries a fixed number of acknowledgment bits. These approaches are discussed below with reference to FIGS. 5A-B.

Figure 5A:
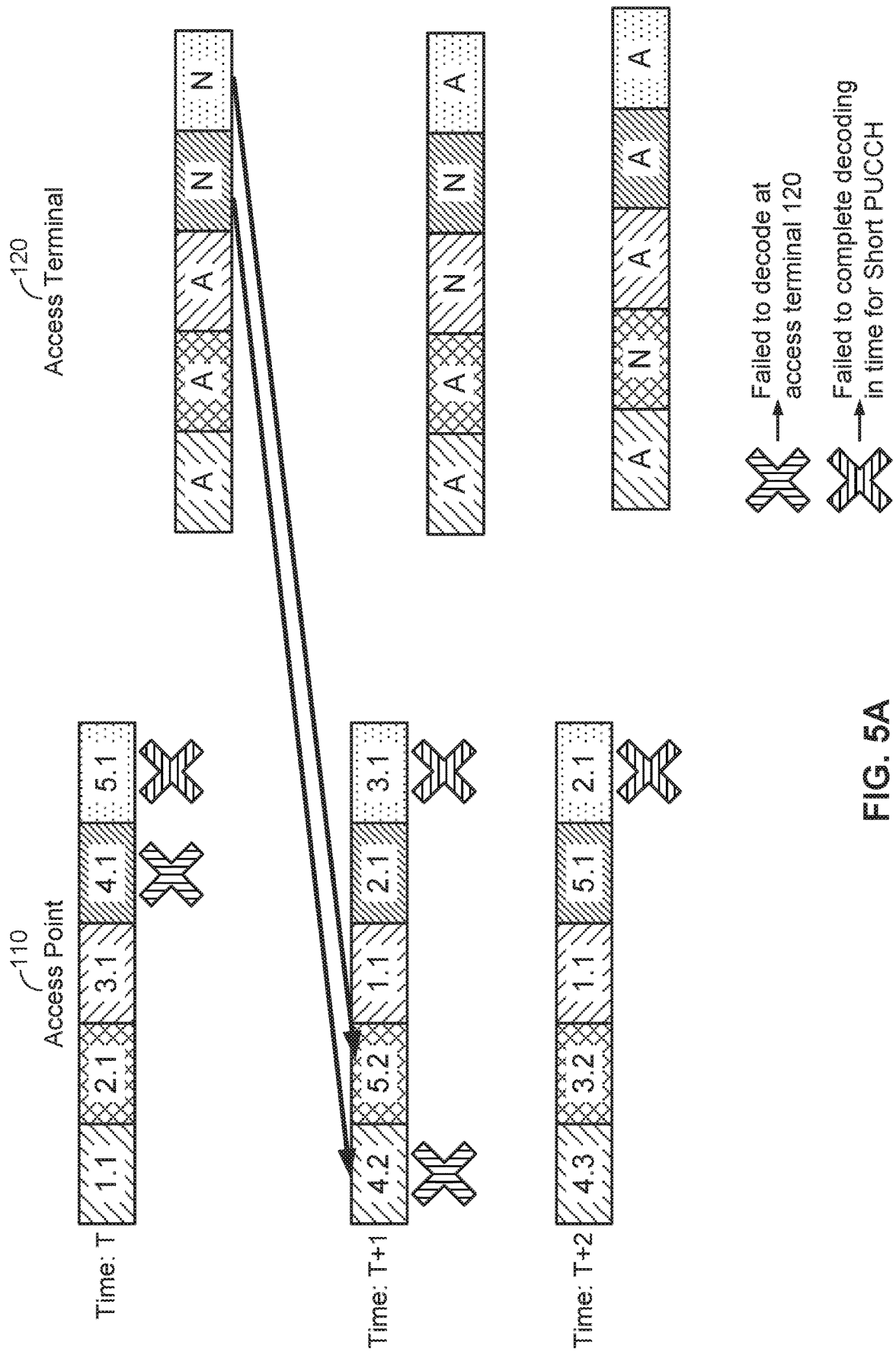
FIG. 5A illustrates an example operation of the dynamic Hybrid Automatic Repeat Request (HARQ) process based short PUCCH payload mapping approach according to at least one aspect of the disclosure.

FIG. 5A illustrates an example operation of the dynamic HARQ-process-based short PUCCH payload mapping approach according to at least one aspect of the disclosure. In the example of FIG. 5A, on the access point 110 side, FIG. 5A illustrates the downlink subframes from the access point 110 to the access terminal 120 for TxOPs at times T, T+1, and T+2. On the access terminal 120 side, FIG. 5A illustrates the contents of the short PUCCH payloads corresponding to the TxOPs at times T, T+1, and T+2. Note that, as in FIG. 4, the times of the TxOPs of T, T+1, and T+2 do not refer to the absolute or relative time between TxOPs, but rather, represent that these are sequential TxOPs between the access point 110 and the access terminal 120.

As further illustrated in FIG. 5A, there are five HARQ processes. As in FIG. 4, the value "X.Y" represents the $Y^{th}$ transmission of the same data for the $X^{th}$ HARQ process. Where a transmission (e.g., "X.1") is successfully received and acknowledged, the subsequent transmission is represented as "X.1" because it represents the first transmission of new data.

As illustrated in FIG. 5A, at time T, the access point 110 sends five downlink subframes, corresponding to five HARQ processes, to the access terminal 120. However, the access terminal 120 fails to decode the first transmission of the fourth HARQ process (represented as subframe "4.1"), and fails to decode the first transmission of the fifth HARQ process (represented as subframe "5.1") within the timeline of the short PUCCH. As such, the access terminal 120 sets the acknowledgment bits of the short PUCCH payload corresponding to the fourth and fifth HARQ processes to "N" (for "NACK"). Note that the access terminal 120 may not differentiate between a failure to decode and a failure to decode within the timeline of the short PUCCH, and as such, sets the bits corresponding to both of these HARQ processes to "N."

At time T+1, the access point 110 transmits new data for HARQ processes 1, 2, and 3 (represented as subframes "1.1," "2.1," and "3.1," respectively), and retransmits the previous transmissions for the fourth and fifth HARQ processes (represented as subframes "4.2" and "5.2," respectively). In the example of FIG. 5A, the access terminal 120 again fails to decode the transmission of the fourth HARQ process. The access terminal 120 also fails to decode the transmission for the third HARQ process (in the fifth subframe) within the timeline of the short PUCCH. As such, the access terminal 120 sets the acknowledgment bits of the short PUCCH payload corresponding to the third and fourth HARQ processes to "N." Note that unlike in FIG. 4, the access terminal 120 sets the bits corresponding to the HARQ processes and not the downlink subframes.

At time T+2, the access point 110 transmits new data for HARQ processes 1, 2, and 5 (represented as subframes "1.1," "2.1," and "5.1," respectively), and retransmits the transmissions for the third and fourth HARQ processes (represented as subframes "3.2" and "4.3," respectively). In the example of FIG. 5A, the access terminal 120 again fails to decode the fifth subframe (i.e., the transmission of the second HARQ process, represented as subframe "2.1") within the timeline of the short PUCCH. As such, the access terminal 120 sets the acknowledgment bit in the short PUCCH payload corresponding to the second HARQ process to "N."

In the example of FIG. 5A, as in the example of FIG. 4, the access terminal 120 is not able to decode the fifth subframe of each TxOP within the timeline of the short PUCCH. As such, for every current TxOP, the access point 110 retransmits whichever HARQ process corresponded to the fifth subframe from the previous TxOP. Instead of doing this, the access point 110 could asynchronously poll the access terminal 120 using a grant-based uplink channel, such as ePUCCH, to determine whether the access terminal 120 received the fifth subframe of the previous TxOP, rather than automatically retransmitting the fifth subframe every time.

In the alternative fixed HARQ-process-based short PUCCH payload mapping approach, resources are mapped to the short PUCCH via a fixed number of HARQ processes. In an aspect, there may be a maximum of H HARQ processes semi-statically configured by the access point 110, of which only a subset of $H_{SUBSET}$ HARQ processes are scheduled at a given time. In this case, the short PUCCH may always carry the latest available acknowledgment bits of all H HARQ processes to allow consistency of communication between the transmitter and receiver. However, the access terminal 120 may automatically set the acknowledgment bits for the remaining HARQ processes (i.e., the H minus $H_{SUBSET}$ HARQ processes) that were not scheduled to "N" for "NACK."

Rules for this approach include a first rule that if a HARQ process is not scheduled, the acknowledgment bit for that HARQ process is set to "N" for "NACK." Second, if no PDCCH subframe is decoded, the acknowledgment bit for that HARQ process is set to "N" for "NACK." Third, if the decoding timeline (e.g., the subframe is not decoded within the timeline of the short PUCCH) is not met, the acknowledgment bit for that HARQ process is set to "N" for "NACK."

Figure 5B:
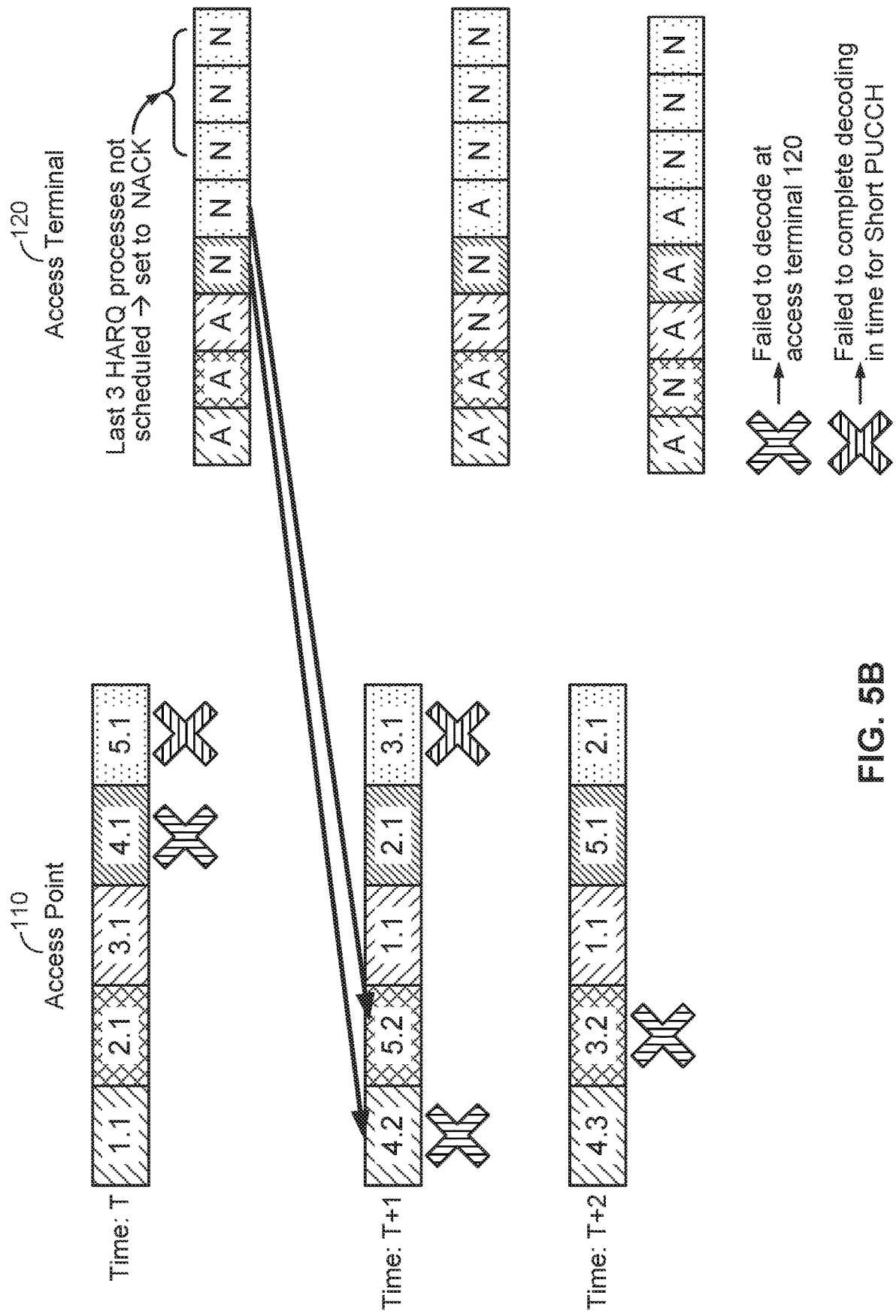
FIG. 5B illustrates an example operation of the fixed HARQ process based short PUCCH payload mapping approach according to at least one aspect of the disclosure.

FIG. 5B illustrates an example operation of the fixed HARQ-process-based short PUCCH payload mapping approach according to at least one aspect of the disclosure. In the example of FIG. 5B, on the access point 110 side, FIG. 5B illustrates the downlink subframes from the access point 110 to the access terminal 120 for TxOPs at times T, T+1, and T+2. On the access terminal 120 side, FIG. 5B illustrates the contents of the short PUCCH payloads corresponding to the TxOPs at times T, T+1, and T+2. Note that, as in FIG. 4, the times of the TxOPs of T, T+1, and T+2 do not refer to the absolute or relative time between TxOPs, but rather, represent that these are sequential TxOPs between the access point 110 and the access terminal 120.

As further illustrated in FIG. 5B, there are eight HARQ processes but only five downlink subframes. As in FIG. 4, the value "X.Y" represents the $Y^{th}$ transmission of the same data for the $X^{th}$ HARQ process. Where a transmission (e.g., "X.1") is successfully received and acknowledged, the subsequent transmission is represented as "X.1" because it represents the first transmission of new data.

As illustrated in FIG. 5B, at time T, the access point 110 sends five downlink subframes, corresponding to five of the eight HARQ processes, to the access terminal 120. However, the access terminal 120 fails to decode the first transmission of the fourth HARQ process (represented as subframe "4.1"), and fails to decode the first transmission of the fifth HARQ process (represented as subframe "5.1") within the timeline of the short PUCCH. Further, the access terminal 120 does not receive subframes for the remaining three HARQ processes (HARQ processes 6, 7, and 8). As such, the access terminal 120 sets the acknowledgment bits of the short PUCCH payload corresponding to the fourth through eighth HARQ processes to "N" (for "NACK").

At time T+1, the access point 110 transmits new data for HARQ processes 1, 2, and 3 (represented as subframes "1.1," "2.1," and "3.1," respectively), and retransmits the previous transmissions for the fourth and fifth HARQ processes (represented as subframes "4.2" and "5.2," respectively). In the example of FIG. 5B, the access terminal 120 again fails to decode the transmission of the fourth HARQ process, and also fails to decode the transmission for the third HARQ process (in the fifth subframe) within the timeline of the short PUCCH. Further, the access terminal 120 does not receive subframes for the remaining three HARQ processes (HARQ processes 6, 7, and 8). As such, the access terminal 120 sets the acknowledgment bits of the short PUCCH payload corresponding to the third, fourth, sixth, seventh, and eighth HARQ processes to "N."

At time T+2, the access point 110 transmits new data for HARQ processes 1, 2, and 5 (represented as subframes "1.1," "2.1," and "5.1," respectively), and retransmits the transmissions for the third and fourth HARQ processes (represented as subframes "3.2" and "4.3," respectively). In the example of FIG. 5B, the access terminal 120 again fails to decode the third HARQ process (represented as subframe "3.2"). Further, the access terminal 120 does not receive subframes for the remaining three HARQ processes (HARQ processes 6, 7, and 8). As such, the access terminal 120 sets the acknowledgment bits in the short PUCCH payload corresponding to the third, sixth, seventh, and eighth HARQ processes to "N."

Thus, as illustrated in the example of FIG. 5B, the short PUCCH may always carry the latest available acknowledgment bits of all H (e.g., eight) HARQ processes to allow consistency of communication between the transmitter and receiver.

In an aspect, the access terminal 120 may be triggered implicitly to transmit a short PUCCH automatically based on the downlink grant and additional instances of the short PUCCH that may be indicated in the downlink grant. The additional instances of the short PUCCH may occur during one or more subsequent TxOPs indicated by the access point 110 unambiguously using a fixed timing relationship relative to the first transmission location of the short PUCCH.

The downlink grant that triggers the short PUCCH may also indicate the resources that the access terminal 120 needs to utilize to transmit the short PUCCH, including the resource block (RB) interlace to be used, the multiplexing code(s) to be used, whether the short PUCCH is transmitted on the special subframe or the modified special subframe, and the specific location of such a subframe relative to the radio frame structure, regardless of fixed or floating frame structures.

Further, if the first instance of a second short PUCCH triggered by a second downlink grant occurs in a different subframe compared to the Nth instance of a previous short PUCCH, then the transmitters (e.g., access terminal 120) use the resources as indicated in their respective downlink grants. On the other hand, if the two instances of the short PUCCH collide on the same subframe, then the transmissions may coalesce to use the configuration indicated by the most recent downlink grant for the short PUCCH. Additionally, if the short PUCCH or PUCCH is required to perform and clear CCA, then this information may be indicated in the downlink grant that triggers the short PUCCH transmission. If the access terminal 120 fails to clear CCA successfully, it may clear its HARQ buffers and assume that the HARQ processes were transmitted, in order to maintain consistency of communication with the access point 110. The access point 110, in this scenario, treats the absence of transmission of the short PUCCH as a lost transmission and may choose to retransmit those downlink subframes or poll the access terminal 120 for acknowledgment information using a grant based channel (e.g., ePUCCH).

Figure 6:
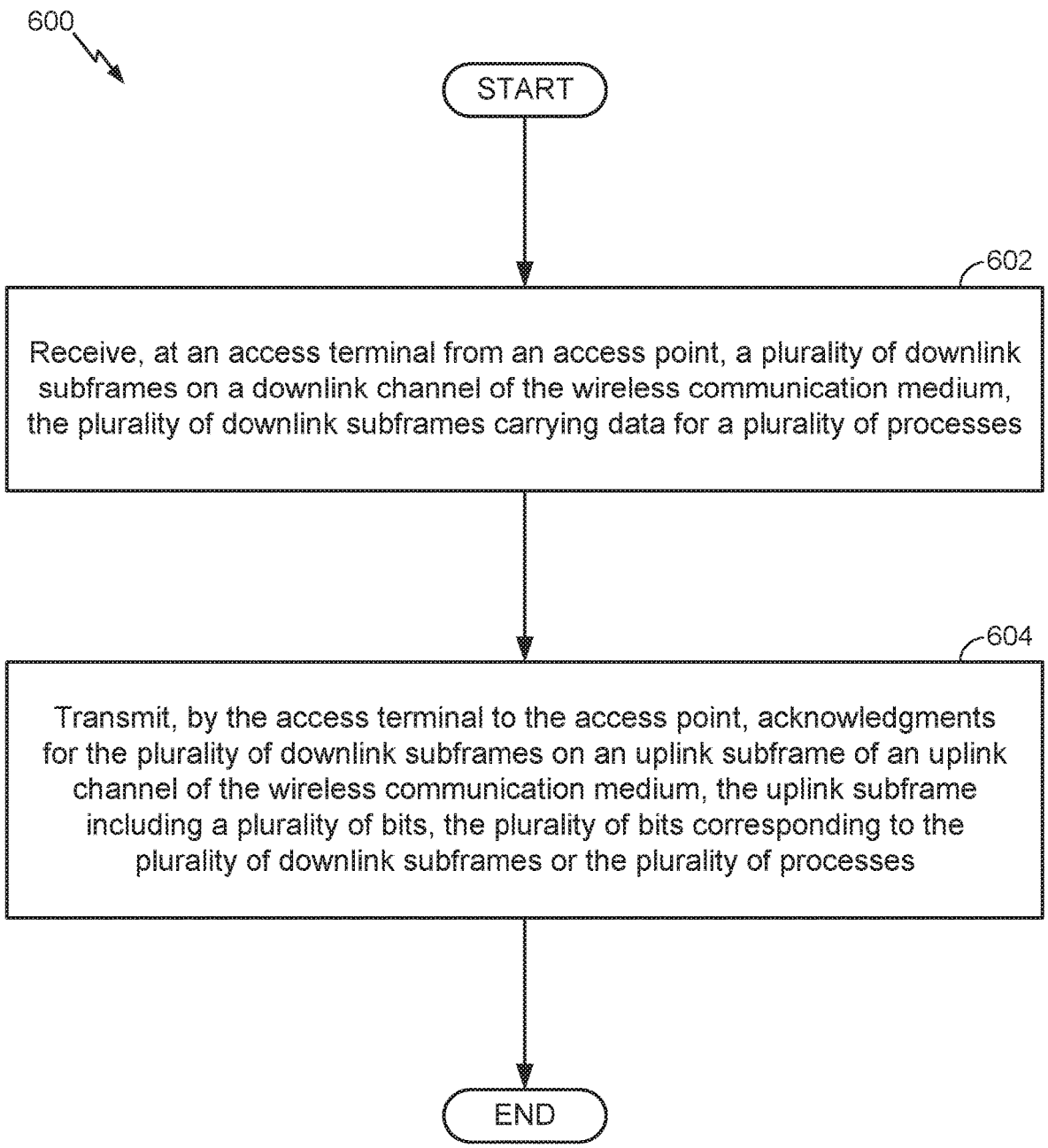
FIG. 6 is a flow diagram illustrating an example method of communication in accordance with the techniques described herein.

FIG. 6 is a flow diagram illustrating an example method 600 of communication in accordance with the techniques described above. The method 600 may be performed, for example, by an access terminal (e.g., the access terminal 120 illustrated in FIG. 1) operating on a shared communication medium (e.g., shared communication medium 140). As an example, the communication medium may include one or more time, frequency, or space resources on an unlicensed radio frequency band shared between LTE technology and Wi-Fi technology devices.

At 602, the access terminal 120 (e.g., the acknowledgment message controller 122 in conjunction with a processor and/or receiver/transceiver of the access terminal 120) receives, from the access point 110, a plurality of downlink subframes on a downlink channel of the wireless communication medium. The plurality of downlink subframes may be carrying data for a plurality of processes.

At 604, the access terminal 120 (e.g., the acknowledgment message controller 122 in conjunction with a processor and/or transmitter/transceiver of the access terminal 120) transmits, to the access point 110, acknowledgments for the plurality of downlink subframes on an uplink subframe of an uplink channel of the wireless communication medium. The uplink subframe may include a plurality of bits corresponding to the plurality of downlink subframes or the plurality of processes. The uplink channel may be a short PUCCH. The plurality of processes may be a plurality of HARQ processes. The receiving at 602 and the transmitting at 604 may occur during a TxOP assigned to the access terminal 120.

As described above with reference to FIG. 4, the number of the plurality of bits corresponding to the plurality of downlink subframes may be a function of the number of the plurality of downlink subframes. For example, an acknowledgment for an $i^{th}$ subframe of the plurality of downlink subframes may be conveyed in an $i^{th}$ bit of the plurality of bits. As another example, the plurality of bits corresponding to the plurality of downlink subframes may map directly to subframe indices of the plurality of downlink subframes.

As described above with reference to FIGS. 5A-B, the number of the plurality of bits corresponding to the plurality of processes may be a function of the number of the plurality of processes. For example, an acknowledgment for an $i^{th}$ process of the plurality of processes may be conveyed in an $i^{th}$ bit of the plurality of bits. As another example, the plurality of bits corresponding to the plurality of processes may map directly to process identifiers of the plurality of processes.

As described above with reference to FIG. 5B, the number of the plurality of downlink subframes may be less than the number of the plurality of processes, and the number of the plurality of bits may be equal to the number of the plurality of processes. The access terminal 120 may set bits of the plurality of bits corresponding to processes of the plurality of processes that are not received during the plurality of downlink subframes to indicate that the processes of the plurality of processes were are not received during the plurality of downlink subframes (e.g., by setting the bits to "N").

The above approaches to sPUCCH payload mapping may also be extended to other types of PUCCH for LTE in unlicensed frequency bands, such as the LTE PUCCH, if employed. For example, assuming that a certain format of the LTE PUCCH, for example Format 3, is employed by LTE in unlicensed frequency bands for uplink acknowledgements, the payload mapping to downlink resources may still be adopted according to the approaches described herein with reference to FIGS. 4-5B.

Although not illustrated in FIG. 6, the method 600 may further include receiving, at the access terminal 120 from the access point 110, a subsequent plurality of downlink subframes on the downlink channel of the wireless communication medium, the subsequent plurality of downlink subframes carrying data for the plurality of processes. The access terminal 120 may transmit, to the access point 110, a subsequent set of acknowledgments for the subsequent plurality of downlink subframes on the uplink subframe of the uplink channel of the wireless communication medium. For a downlink subframe of the plurality of downlink subframes that was not decoded before transmission of a corresponding acknowledgment in the plurality of bits of the uplink subframe, the access terminal 120 may set a corresponding bit of the plurality of bits to indicate that the downlink subframe was not decoded. In that case, the subsequent plurality of downlink subframes may include the downlink subframe of the plurality of downlink subframes that was not decoded before transmission of the corresponding acknowledgment in the plurality of bits of the uplink subframe. The access point 110 may also asynchronously poll the access terminal for an acknowledgment of the downlink subframe on a grant-based PUCCH, such as the ePUCCH.

For generality, the access point 110 and the access terminal 120 are shown in FIG. 1 only in relevant part as including the acknowledgment message controller 112 and the acknowledgment message controller 122, respectively. It will be appreciated, however, that the access point 110 and the access terminal 120 may be configured in various ways to provide or otherwise support the techniques discussed herein.

Figure 7:
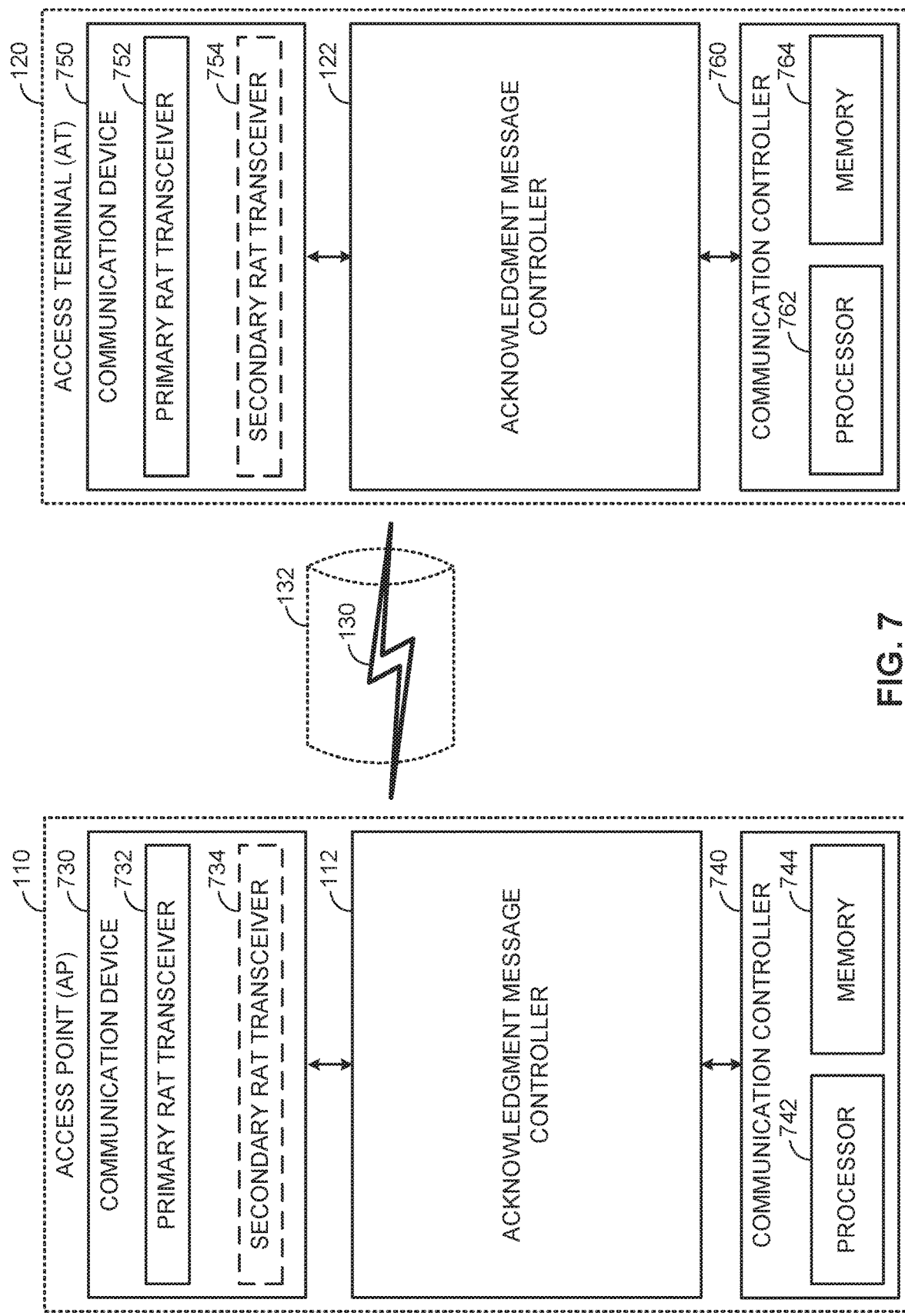
FIG. 7 is a device-level diagram illustrating example components of an access point and an access terminal in more detail.

FIG. 7 is a device-level diagram illustrating example components of the access point 110 and the access terminal 120 of the primary RAT system 100 in more detail. As shown, the access point 110 and the access terminal 120 may each generally include a wireless communication device (represented by the communication devices 730 and 750) for communicating with other wireless nodes via at least one designated RAT. The communication devices 730 and 750 may be variously configured for transmitting and encoding signals, and, conversely, for receiving and decoding signals in accordance with the designated RAT (e.g., messages, indications, information, pilots, and so on).

The communication devices 730 and 750 may include, for example, one or more transceivers, such as respective primary RAT transceivers 732 and 752, and, in some designs, (optional) co-located secondary RAT transceivers 734 and 754, respectively (corresponding, for example, to the RAT employed by the competing RAT system 150). As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a radio chip or similar circuitry providing low-level sniffing only). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The access point 110 and the access terminal 120 may also each generally include a communication controller (represented by the communication controllers 740 and 760) for controlling operation of their respective communication devices 730 and 750 (e.g., directing, modifying, enabling, disabling, etc.). The communication controllers 740 and 760 may include one or more processors 742 and 762, and one or more memories 744 and 764 coupled to the processors 742 and 762, respectively. The memories 744 and 764 may be configured to store data, instructions, or a combination thereof, either as on-board cache memory, as separate components, a combination, etc. The processors 742 and 762 and the memories 744 and 764 may be standalone communication components or may be part of the respective host system functionality of the access point 110 and the access terminal 120.

It will be appreciated that the acknowledgment message controller 112 and the acknowledgment message controller 122 may be implemented in different ways. In some designs, some or all of the functionality associated therewith may be implemented by or otherwise at the direction of at least one processor (e.g., one or more of the processors 742 and/or one or more of the processors 762) and at least one memory (e.g., one or more of the memories 744 and/or one or more of the memories 764). In other designs, some or all of the functionality associated therewith may be implemented as a series of interrelated functional modules.

Figure 8:
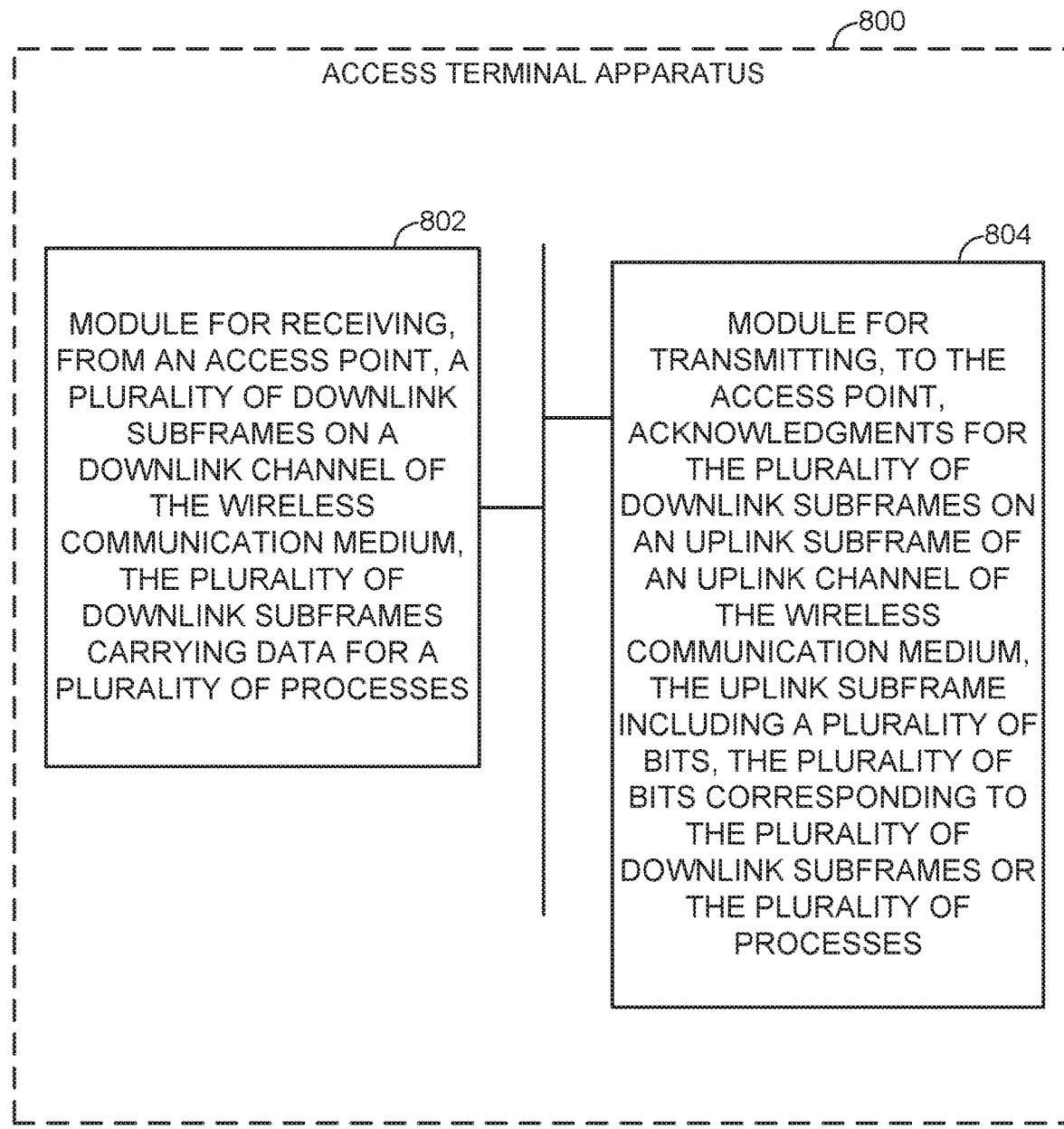
FIG. 8 illustrates an example access terminal apparatus represented as a series of interrelated functional modules.

FIG. 8 illustrates an example access terminal apparatus for implementing the described herein represented as a series of interrelated functional modules. In the illustrated example, the apparatus 800 includes a module for receiving 802 (which may correspond, in some aspects, to the communication device 750 in conjunction with the acknowledgment message controller 122) and a module for transmitting 804 (which may correspond, in some aspects, to the communication device 750 in conjunction with the acknowledgment message controller 122). In an aspect, the module for receiving 802 may receive, from an access point (e.g., access point 110), a plurality of downlink subframes on a downlink channel of the wireless communication medium, the plurality of downlink subframes carrying data for a plurality of processes. The module for transmitting 804 may transmit, to the access point, acknowledgments for the plurality of downlink subframes on an uplink subframe of an uplink channel of the wireless communication medium on one or more occasions, the uplink subframe including a plurality of bits, the plurality of bits corresponding to the plurality of downlink subframes or the plurality of processes.

The functionality of the modules of FIG. 8 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 8, as well as other components and functions described herein, may be implemented using any suitable means. Such means also may be implemented, at least in part, using corresponding structure as taught herein. For example, the components described above in conjunction with the "module for" components of FIG. 8 also may correspond to similarly designated "means for" functionality. Thus, in some aspects one or more of such means may be implemented using one or more of processor components, integrated circuits, or other suitable structure as taught herein, including as an algorithm. One skilled in the art will recognize in this disclosure an algorithm represented in the prose described above, as well in sequences of actions that may be represented by pseudocode. For example, the components and functions represented by FIG. 8 may include code for performing a LOAD operation, a COMPARE operation, a RETURN operation, an IF-THEN-ELSE loop, and so on.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for communication.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method for transmitting acknowledgments on a wireless communication medium, comprising:
   receiving, at an access terminal from an access point, a plurality of downlink subframes on a downlink channel of the wireless communication medium, the plurality of downlink subframes carrying data for a plurality of processes; and
   transmitting, by the access terminal to the access point, acknowledgments for the plurality of downlink subframes on an uplink subframe of an uplink channel of the wireless communication medium on one or more occasions, the uplink subframe including a plurality of bits, the plurality of bits corresponding to the plurality of downlink subframes or the plurality of processes, wherein the uplink channel comprises a short physical uplink control channel (PUCCH).

2. The method of claim 1, wherein the plurality of processes comprises a plurality of Hybrid Automatic Repeat Request (HARQ) processes.

3. The method of claim 2, wherein the plurality of HARQ processes comprises a plurality of code blocks.

4. The method of claim 3, wherein a number of the plurality of bits corresponding to the plurality of downlink subframes is a function of a number of the plurality of downlink subframes and a number of the plurality of HARQ processes and the plurality of code blocks.

5. The method of claim 4, wherein an acknowledgment for an $i^{th}$ subframe of the plurality of downlink subframes is conveyed in an $i^{th}$ bit of the plurality of bits.

6. The method of claim 4, wherein the plurality of bits corresponding to the plurality of downlink subframes map directly to subframe indices of the plurality of downlink subframes.

7. The method of claim 1, wherein a number of the plurality of bits corresponding to the plurality of processes is a function of a number of the plurality of processes.

8. The method of claim 1, wherein an acknowledgment for an $i^{th}$ process of the plurality of processes is conveyed in an $i^{th}$ bit of the plurality of bits.

9. The method of claim 1, wherein the plurality of bits corresponding to the plurality of processes map directly to process identifiers of the plurality of processes.

10. The method of claim 1, wherein the plurality of bits within each of the plurality of processes map to code block identifiers within each of the plurality of processes.

11. The method of claim 1, wherein a number of the plurality of downlink subframes is less than a number of the plurality of processes, and wherein a number of the plurality of bits is equal to the number of the plurality of processes.

12. The method of claim 11, wherein the access terminal sets bits of the plurality of bits corresponding to processes of the plurality of processes that are not received during the plurality of downlink subframes to indicate that the processes of the plurality of processes during the plurality of downlink subframes were not acknowledged.

13. The method of claim 1, further comprising:
receiving, at the access terminal from the access point, a subsequent plurality of downlink subframes on the downlink channel of the wireless communication medium, the subsequent plurality of downlink subframes carrying data for the plurality of processes; and
transmitting, by the access terminal to the access point, a subsequent set of acknowledgments for the subsequent plurality of downlink subframes on the uplink subframe of the uplink channel of the wireless communication medium.

14. The method of claim 13, wherein, for a downlink subframe of the plurality of downlink subframes that was not decoded before transmission of a corresponding acknowledgment in the plurality of bits of the uplink subframe, the access terminal sets a corresponding bit of the plurality of bits to indicate that the downlink subframe was not acknowledged.

15. The method of claim 14, wherein the subsequent plurality of downlink subframes includes the downlink subframe of the plurality of downlink subframes that was not decoded before transmission of the corresponding acknowledgment in the plurality of bits of the uplink subframe.

16. The method of claim 14, wherein the access point asynchronously polls the access terminal for an acknowledgment of the downlink subframe on a grant-based PUCCH.

17. The method of claim 1, wherein the receiving and transmitting occur during a transmission opportunity (TxOP) assigned to the access terminal.

18. The method of claim 1, wherein an acknowledgment comprises a positive acknowledgment (ACK) or a negative acknowledgment (NACK).

19. An apparatus for transmitting acknowledgments on a wireless communication medium, comprising:
a receiver of an access terminal configured to receive, from an access point, a plurality of downlink subframes on a downlink channel of the wireless communication medium, the plurality of downlink subframes carrying data for a plurality of processes; and
a transmitter of the access terminal configured to transmit, to the access point, acknowledgments for the plurality of downlink subframes on an uplink subframe of an uplink channel of the wireless communication medium on one or more occasions, the uplink subframe including a plurality of bits, the plurality of bits corresponding to the plurality of downlink subframes or the plurality of processes, wherein the uplink channel comprises a short physical uplink control channel (PUCCH).

20. The apparatus of claim 19, wherein the plurality of processes comprises a plurality of Hybrid Automatic Repeat Request (HARQ) processes.

21. The apparatus of claim 20, wherein the plurality of HARQ processes comprises a plurality of code blocks.

22. The apparatus of claim 21, wherein a number of the plurality of bits corresponding to the plurality of downlink subframes is a function of a number of the plurality of downlink subframes and a number of the plurality of HARQ processes and the plurality of code blocks.

23. The apparatus of claim 22, wherein an acknowledgment for an $i^{th}$ subframe of the plurality of downlink subframes is conveyed in an $i^{th}$ bit of the plurality of bits.

24. The apparatus of claim 22, wherein the plurality of bits corresponding to the plurality of downlink subframes map directly to subframe indices of the plurality of downlink subframes.

25. The apparatus of claim 19, wherein a number of the plurality of bits corresponding to the plurality of processes is a function of a number of the plurality of processes.

26. The apparatus of claim 19, wherein an acknowledgment for an $i^{th}$ process of the plurality of processes is conveyed in an $i^{th}$ bit of the plurality of bits.

27. The apparatus of claim 19, wherein the plurality of bits corresponding to the plurality of processes map directly to process identifiers of the plurality of processes.

28. The apparatus of claim 19, wherein the plurality of bits within each of the plurality of processes map to code block identifiers within each of the plurality of processes.

29. The apparatus of claim 19, wherein a number of the plurality of downlink subframes is less than a number of the plurality of processes, and wherein a number of the plurality of bits is equal to the number of the plurality of processes.

30. The apparatus of claim 29, wherein the access terminal sets bits of the plurality of bits corresponding to processes of the plurality of processes that are not received during the plurality of downlink subframes to indicate that the processes of the plurality of processes during the plurality of downlink subframes were not acknowledged.

31. The apparatus of claim 19, wherein the receiver is further configured to receive, from the access point, a subsequent plurality of downlink subframes on the downlink channel of the wireless communication medium, the subsequent plurality of downlink subframes carrying data for the plurality of processes, and
wherein the transmitter is further configured to transmit, to the access point, a subsequent set of acknowledgments for the subsequent plurality of downlink subframes on the uplink subframe of the uplink channel of the wireless communication medium.

32. The apparatus of claim 31, wherein, for a downlink subframe of the plurality of downlink subframes that was not decoded before transmission of a corresponding acknowledgment in the plurality of bits of the uplink subframe, the access terminal sets a corresponding bit of the plurality of bits to indicate that the downlink subframe was not acknowledged.

33. The apparatus of claim 32, wherein the subsequent plurality of downlink subframes includes the downlink subframe of the plurality of downlink subframes that was not decoded before transmission of the corresponding acknowledgment in the plurality of bits of the uplink subframe.

34. The apparatus of claim 32, wherein the access point asynchronously polls the access terminal for an acknowledgment of the downlink subframe on a grant-based PUCCH.

35. The apparatus of claim 19, wherein the receiving and transmitting occur during a transmission opportunity (TxOP) assigned to the access terminal.

36. The apparatus of claim 19, wherein an acknowledgment comprises a positive acknowledgment (ACK) or a negative acknowledgment (NACK).

37. An access terminal configured to transmit acknowledgments on a wireless communication medium, comprising:
   a means for receiving configured to receive, from an access point, a plurality of downlink subframes on a downlink channel of the wireless communication medium, the plurality of downlink subframes carrying data for a plurality of processes; and
   a means for transmitting configured to transmit, to the access point, acknowledgments for the plurality of downlink subframes on an uplink subframe of an uplink channel of the wireless communication medium on one or more occasions, the uplink subframe including a plurality of bits, the plurality of bits corresponding to the plurality of downlink subframes or the plurality of processes, wherein the uplink channel comprises a short physical uplink control channel (PUCCH).

38. A non-transitory computer-readable medium storing computer-executable code for transmitting acknowledgments on a wireless communication medium, the computer-executable code comprising:
   at least one instruction to cause an access terminal to receive, from an access point, a plurality of downlink subframes on a downlink channel of the wireless communication medium, the plurality of downlink subframes carrying data for a plurality of processes; and
   at least one instruction to cause the access terminal to transmit, to the access point, acknowledgments for the plurality of downlink subframes on an uplink subframe of an uplink channel of the wireless communication medium on one or more occasions, the uplink subframe including a plurality of bits, the plurality of bits corresponding to the plurality of downlink subframes or the plurality of processes, wherein the uplink channel comprises a short physical uplink control channel (PUCCH).

* * * * *